US010863223B2

(12) United States Patent
Evans et al.

(10) Patent No.: US 10,863,223 B2
(45) Date of Patent: *Dec. 8, 2020

(54) DIGITAL OVERLAY OFFERS ON CONNECTED MEDIA DEVICES

(71) Applicant: The Nielsen Company (US), LLC, New York, NY (US)

(72) Inventors: David John Evans, Monmouth (GB); Thomas Greenway, Gilwern (GB); Martin Ian Spicer, Pontypridd (GB)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,081

(22) Filed: Apr. 18, 2019

(65) Prior Publication Data

US 2019/0246156 A1 Aug. 8, 2019

Related U.S. Application Data

(63) Continuation of application No. 16/052,267, filed on Aug. 1, 2018, now Pat. No. 10,341,706, which is a (Continued)

(51) Int. Cl.
 *H04H 60/32* (2008.01)
 *H04N 7/16* (2011.01)
 (Continued)

(52) U.S. Cl.
 CPC ......... *H04N 21/2668* (2013.01); *G06Q 20/20* (2013.01); *G06Q 20/367* (2013.01);
 (Continued)

(58) Field of Classification Search
 None
 See application file for complete search history.

(56) References Cited

U.S. PATENT DOCUMENTS 7,302,696 B1 * 11/2007 Yamamoto ............. G06Q 30/02
 348/E7.061
2002/0006787 A1 1/2002 Darby
 (Continued)

FOREIGN PATENT DOCUMENTS

CN 101499159 A 8/2009
CN 102129645 A 7/2011
 (Continued)

OTHER PUBLICATIONS

International Search Report and Written Opinion, Application No. PCT/US/51532, dated Dec. 8, 2016, 15 pages.
 (Continued)

*Primary Examiner* — William J Kim
(74) *Attorney, Agent, or Firm* — McDonnell Boehnen Hulbert & Berghoff LLP

(57) ABSTRACT

A computing device includes memory for storing commercial metadata and offer metadata harvested from within an offer distribution network. A processor compares the commercial metadata related to a broadcast commercial to be streamed to a client media device with the offer metadata related to available offers from offer providers, to generate a comparison. The processor then selects an offer from the available offers based on the comparison; determines when and over what video stream the broadcast commercial is to be streamed; detects that a screen device is paired to the client media device; and delivers the offer to a display of the screen device during streaming of the broadcast commercial over the video stream to the client media device. When a user of the screen device selects an indicia of the offer, the offer is collected into a virtual wallet from which the offer can be redeemed in various ways.

20 Claims, 13 Drawing Sheets

Related U.S. Application Data continuation of application No. 15/130,639, filed on Apr. 15, 2016, now Pat. No. 10,075,755.

(60) Provisional application No. 62/220,466, filed on Sep. 18, 2015.

(51) Int. Cl.

| | | |
|---|---|---|
| *H04N 21/2668* | (2011.01) | |
| *H04N 21/258* | (2011.01) | |
| *H04N 21/2665* | (2011.01) | |
| *H04N 21/41* | (2011.01) | |
| *H04N 21/431* | (2011.01) | |
| *H04N 21/436* | (2011.01) | |
| *H04N 21/442* | (2011.01) | |
| *H04N 21/478* | (2011.01) | |
| *H04N 21/4784* | (2011.01) | |
| *H04N 21/81* | (2011.01) | |
| *G06Q 20/20* | (2012.01) | |
| *G06Q 20/36* | (2012.01) | |

(52) U.S. Cl.
CPC . *H04N 21/25841* (2013.01); *H04N 21/25883* (2013.01); *H04N 21/25891* (2013.01); *H04N 21/2665* (2013.01); *H04N 21/4122* (2013.01); *H04N 21/4126* (2013.01); *H04N 21/4316* (2013.01); *H04N 21/43615* (2013.01); *H04N 21/44222* (2013.01); *H04N 21/4784* (2013.01); *H04N 21/47815* (2013.01); *H04N 21/812* (2013.01)

(56) References Cited

U.S. PATENT DOCUMENTS

| | | |
|---|---|---|
| 2002/0077907 A1 | 6/2002 | Ukai et al. |
| 2002/0100063 A1 | 7/2002 | Herigstad et al. |
| 2003/0149621 A1 | 8/2003 | Shteyn |
| 2004/0073482 A1 | 4/2004 | Wiggins et al. |
| 2005/0177861 A1 | 8/2005 | Ma et al. |
| 2006/0015405 A1 | 1/2006 | Bala et al. |
| 2006/0090185 A1 | 4/2006 | Zito et al. |
| 2006/0167753 A1 | 7/2006 | Teague et al. |
| 2007/0143788 A1 | 6/2007 | Abernethy et al. |
| 2007/0203791 A1 | 8/2007 | Kohl et al. |
| 2008/0010114 A1 | 1/2008 | Head |
| 2008/0201731 A1 | 8/2008 | Howcroft |
| 2008/0319846 A1 | 12/2008 | Leming et al. |
| 2009/0317053 A1* | 12/2009 | Morley ............. H04N 7/173 386/343 |
| 2010/0061709 A1 | 3/2010 | Agnihotri et al. |
| 2010/0251292 A1 | 9/2010 | Srinivasan et al. |
| 2012/0053999 A1 | 3/2012 | Pan |
| 2012/0072943 A1 | 3/2012 | Pan |
| 2012/0296745 A1 | 11/2012 | Harper et al. |
| 2012/0310720 A1 | 12/2012 | Balsan et al. |
| 2013/0013499 A1 | 1/2013 | Kalgi |
| 2013/0024881 A1* | 1/2013 | Liu ............. G06Q 30/0207 725/23 |
| 2013/0036001 A1 | 2/2013 | Wegner et al. |
| 2013/0080229 A1 | 3/2013 | Fisher |
| 2013/0085828 A1 | 4/2013 | Schuster |
| 2013/0103716 A1* | 4/2013 | Yamagishi ........... H04H 60/23 707/770 |
| 2013/0152210 A1* | 6/2013 | Petrovic ............. G06F 21/10 726/26 |
| 2014/0040935 A1 | 2/2014 | Gharachorloo et al. |
| 2014/0122205 A1 | 5/2014 | Sohya et al. |
| 2014/0164078 A1 | 6/2014 | Craner et al. |
| 2014/0164093 A1 | 6/2014 | Libman |
| 2014/0229983 A1 | 8/2014 | Malik |
| 2014/0257920 A1 | 9/2014 | Gilman et al. |
| 2015/0261753 A1 | 9/2015 | Winograd et al. |
| 2015/0264429 A1 | 9/2015 | Winograd et al. |
| 2015/0281163 A1 | 10/2015 | Bastide et al. |
| 2015/0324947 A1 | 11/2015 | Winograd et al. |
| 2016/0055606 A1* | 2/2016 | Petrovic ............. G06T 1/0085 382/100 |
| 2016/0180379 A1 | 6/2016 | Salmon et al. |

FOREIGN PATENT DOCUMENTS

| | | |
|---|---|---|
| CN | 103402177 A | 11/2013 |
| KR | 10-2014-0064165 A | 5/2014 |

OTHER PUBLICATIONS

Launching on 27 TV networks globally. First networks launched in 2015. Integrated into 70% of retailers. Embedded into Apple Wallet & Google Wallet. http://www.actv8me.com/tv/, Retrieved on Aug. 30, 2016, 24 pages.

Notice to File a Response ("preliminary rejection") from the Korean Patent Application No. 10-2018-7010846, dated Mar. 8, 2019 from the Korean Intellectual Property Office (KIPO).

U.S. Appl. No. 16/388,070, Non Final Office Action dated Mar. 4, 2020.

U.S. Appl. No. 16/388,097, Non Final Office Action dated Mar. 2, 2020.

U.S. Appl. No. 16/388,070, Final Office Action dated May 5, 2020.

U.S. Appl. No. 16/388,097, Final Office Action dated Apr. 30, 2020.

* cited by examiner

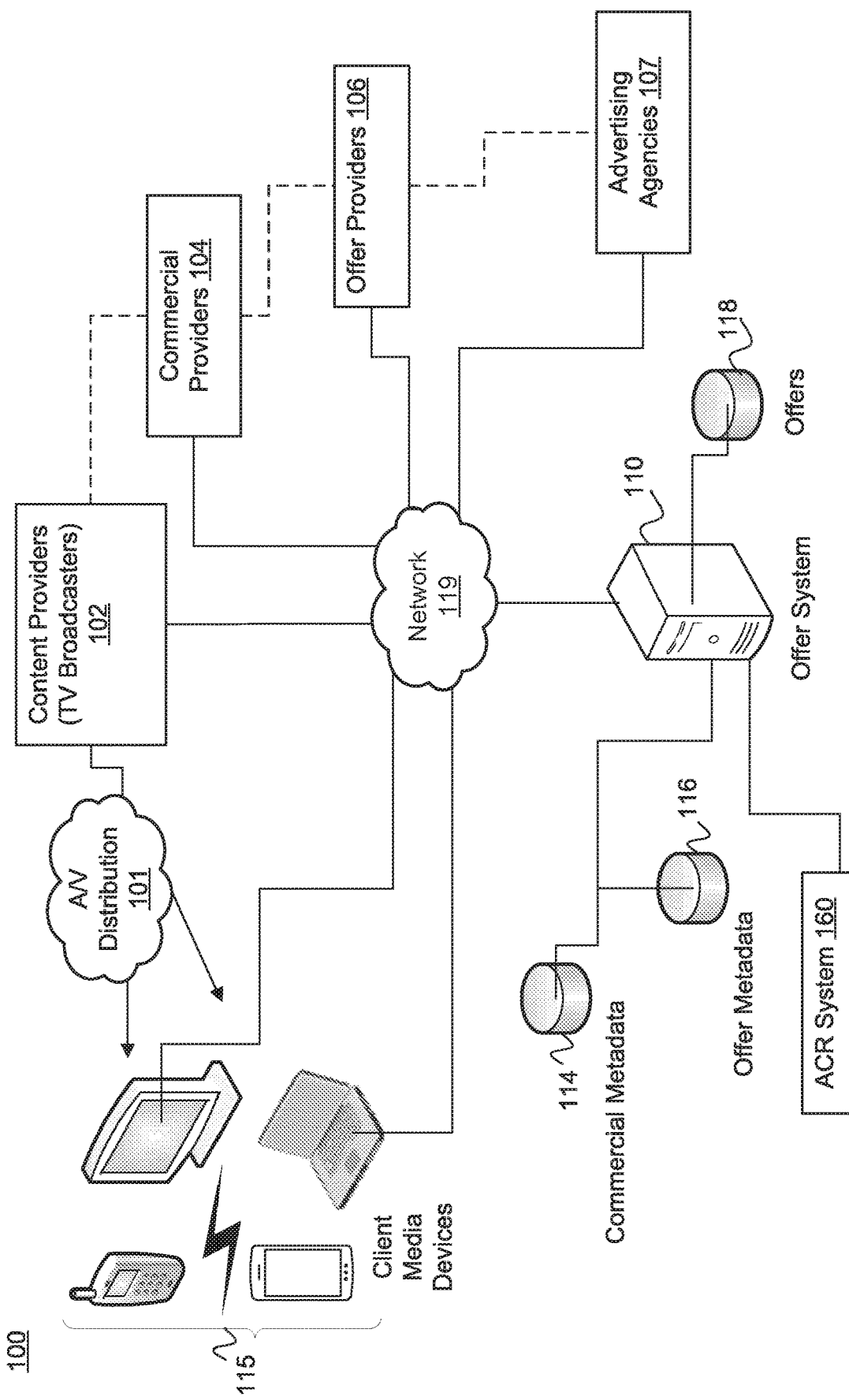

| | |
|---|---|
| Advertiser : | The Advertiser |
| Code : | XYZ123456 |
| Title of Commercial : | Summer Edisonn Commercial for Product A |
| Product Featured Name : | Product A |
| Category : | Electronics |
| Description : | This is a commercial depicting The Advertiser's new product, Product A. It is filmed against a summer backdrop with lots of people having a great time using Product A in the Summer |
| Channel : | FOX WABC 5 |
| Timestamp : | 20140905 : 14:05:29 |

Creative Thumbnail

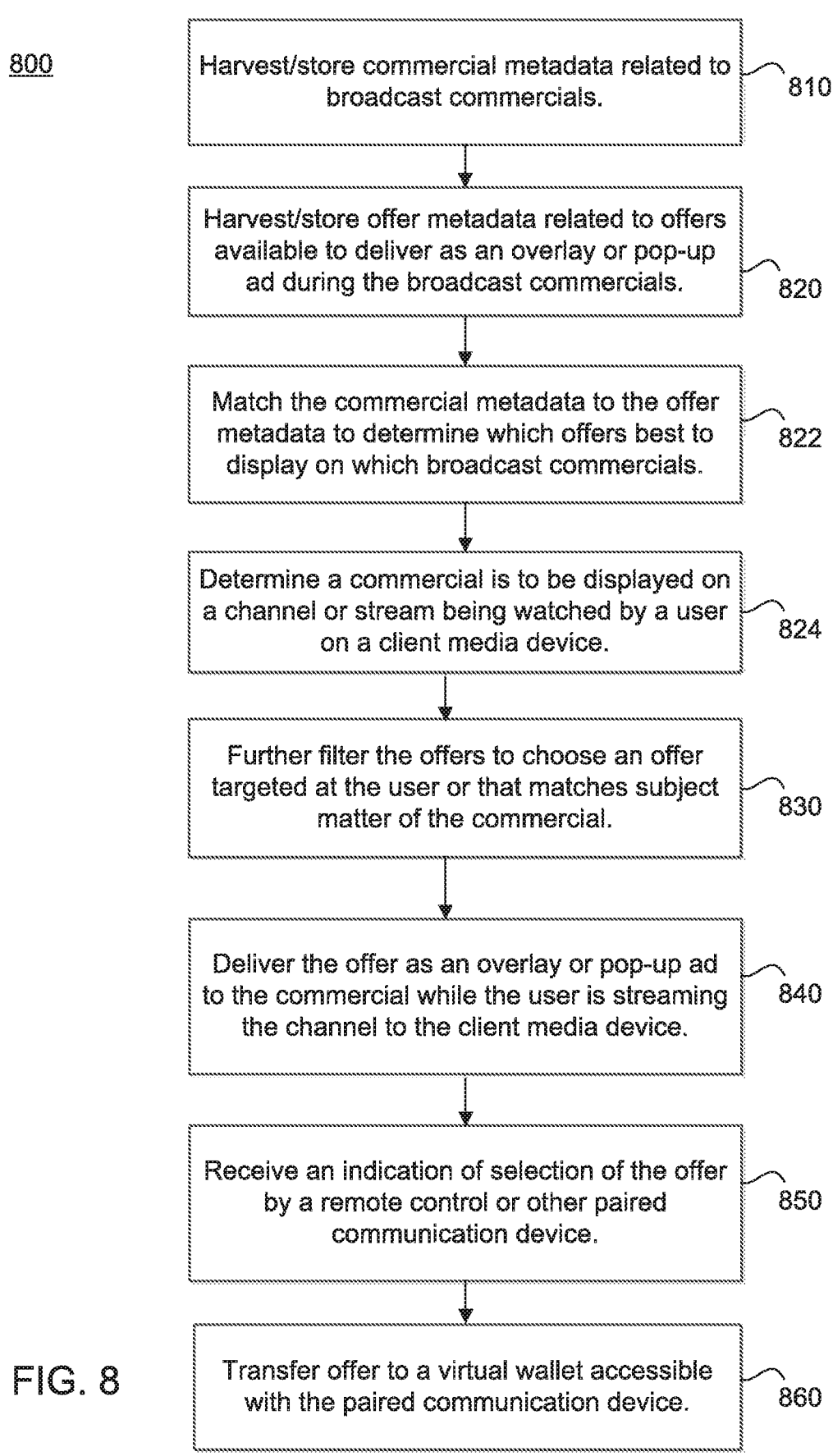

DIGITAL OVERLAY OFFERS ON CONNECTED MEDIA DEVICES

CROSS REFERENCE TO RELATED APPLICATIONS

This U.S. patent application is a continuation of, and claims priority to, U.S. patent application Ser. No. 16/052,267, filed on Aug. 1, 2018, which is a continuation of, and claims priority to, U.S. patent application Ser. No. 15/130,639, filed on Apr. 15, 2016, which claims priority to U.S. Provisional Application 62/220,466, filed on Sep. 18, 2015. The disclosures of these prior applications are considered part of the disclosure of this application and are hereby incorporated by reference in their entireties.

BACKGROUND

Media consumption devices, such as smart televisions (TVs) and set-top-boxes (STBs), may access digital content and receive data across a number of mechanisms, such as traditional broadcast television channels via satellite or over the air (OTA), or streaming media via a telephone line, cable, Internet, and so forth upon request. Media consumption devices, such as smart televisions (TVs), may access broadcast digital content and receive data, such as streaming media, from data networks (such as the Internet). Streaming media refers to a service in which media content such as movies or news may be provided to an end user over a telephone line, cable, Internet, and so forth upon request. For example, a user may view a movie without having to leave their residence.

As the number of media consumption devices continues to increase, video content generation and delivery may similarly increase. With an increase in use of media consuming devices (such as smartphones, tablets, and smart televisions) to access streaming media, content or network providers (such as local broadcasters, multi-channel networks, and other content owners/distributors) may distribute contextually-relevant material to viewers that are consuming streaming media (e.g., media programs). For example, local broadcasters may include contextually-relevant advertisements and interactive content with streaming media.

Traditional television broadcast advertising helps provide a marketing mix for marketers to promote their goods and services to users. Traditionally, however, a user may not act immediately on consumer interest gained from a television broadcast commercial or a new commercial plays immediately afterwards, diverting the user's attention and lessening the chance a user will follow up on an initial interest in the good or service advertised in the television broadcast commercial.

DESCRIPTION OF DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates a system diagram of an offer distribution network according to one embodiment.

FIG. 4 illustrates an example of a media commercial together with related metadata according to one embodiment.

FIG. 5A illustrates an example offer together with offer metadata in a direct offer example of the present disclosure.

FIG. 5B illustrates an example offer together with offer metadata in an indirect offer example of the present disclosure.

FIG. 8 illustrates a flowchart of a method of providing digital offers on a connected media device.

DETAILED DESCRIPTION

Figure 2A:
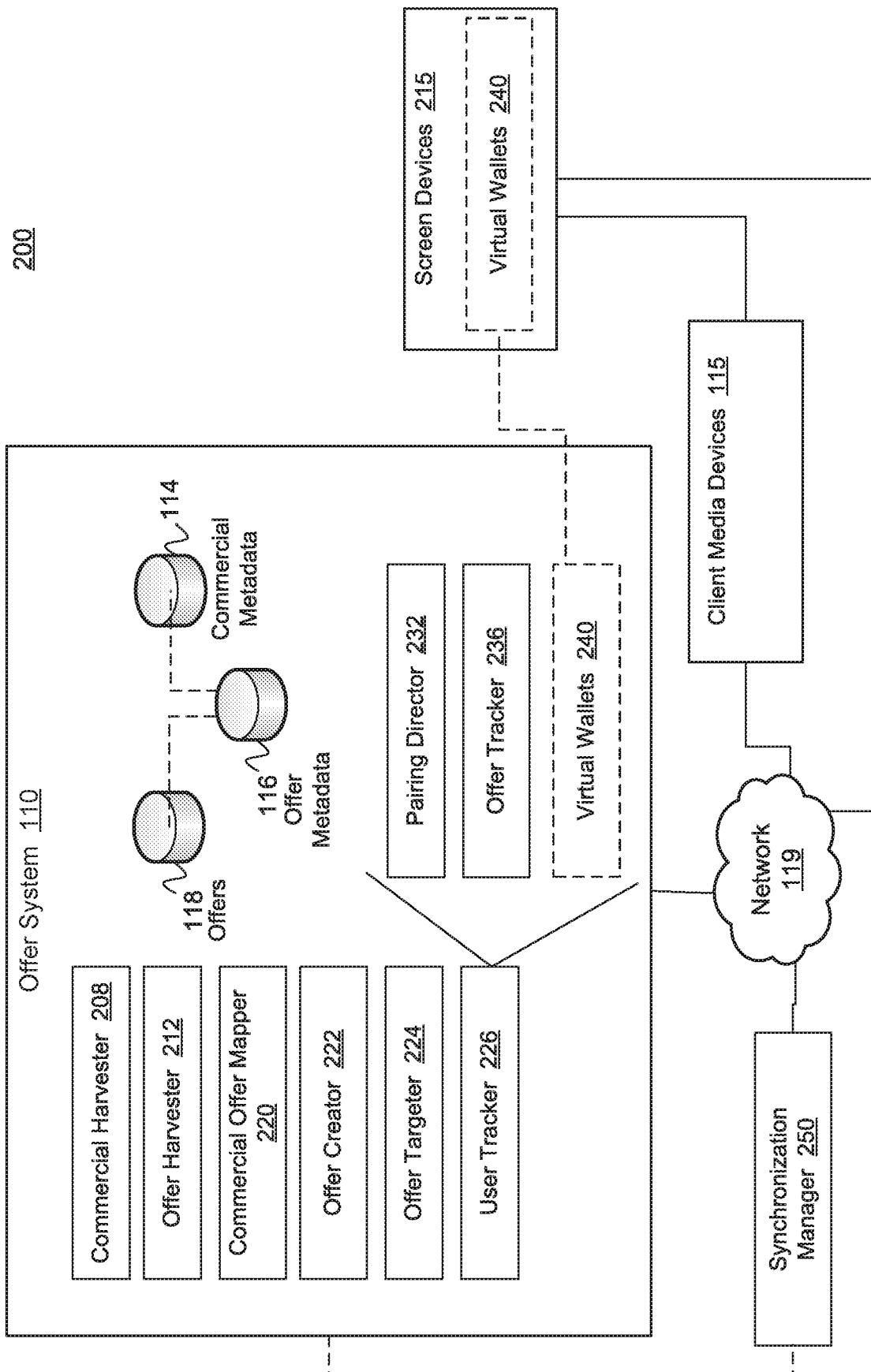
FIG. 2A illustrates a diagram of one embodiment of the offer system of FIG. 1, within an offer distribution network.

Media content broadcasting or streaming, such as television (TV) or internet show broadcasting, can be an engaging venue to advertise products and services, provide information to viewers (also referred to as "users" herein), or any combination thereof. Accordingly, broadcasters want to know what programs individual viewers are watching, and when, such that subject matter of those programs may be used to accurately target offers and other useful, optionally non-commercial information to the viewers. Non-commercial information may include, for example, news alerts, announcements or educational information. It would therefore be advantageous to determine a program a user is watching or is about to watch, and to send an identification of the program information to an offer system for use in such targeting actions. In similar fashion, a user may want to obtain targeted offers that may have been displayed during a program, but missed because the user stepped out or could not be present. An offer, as referred to herein, extends to any offer, advertisement, coupon, deal, discount or in-kind benefit.

To increase the impact and effectiveness of television broadcast commercials, users may want a benefit that is easy to obtain and targeted to meet their needs or interests identified through various commercials. An offer system and methods may provide such benefits by matching metadata related to product or service offers (herein also referred to as just "offers") from multiple sources to metadata of programs and/or television commercials that may originate from multiple channels, so as to deliver the best offers to respective commercials across a wide variety of broadcasted content and commercials. User profile type information may also be used to target certain offers to identified users.

In one embodiment, a screen device (such as an intelligent remote control, a smart phone, tablet and the like) may be paired with a client media device (e.g., a TV or computer) to which programming is being streamed. The screen device may, acting as a type of remote control, interact with offer-related selections on the client media device, including by selecting the offer itself, thus choosing to collect the offer. In another embodiment, an application running on the screen device may display the offer that corresponds to a TV commercial being streamed to the client media device to which the screen device is paired. A user may then directly collect the offer by selecting the offer being displayed on the screen device. In yet another embodiment, there is only a single screen device to which TV programming is streamed and on which an application (or software development kit (SDK)) is executed that detects when a commercial is played, and delivers an overlay or pop-up offer on the same screen that best targets the commercial. This overlay or pop-up offer may be selectable through a display of the single screen device by a user, to collect the offer.

The offer system and methods may aggregate collected offers in one place such as a virtual wallet accessible by the user from the screen device as well as from numerous other devices, thus allowing the user to digitally collect these benefits immediately at the time the commercial is broadcast, yet still be able to redeem the offers at a time and location convenient to the user (e.g., with a purchase online or at a physical store location). Offers may also be collected belatedly by browsing on the screen device to already displayed offers, e.g., those offers that the user may have missed when stepping out or being absent.

The offer system may generate offers from related sources as well. For example, offers related to the same branded products may be generated by a brand owner, by franchisees or by retailers authorized to carry and sell the branded products or services for which the offers are targeted to the users. The disclosed offer system and method may also send an identification of a channel the user is watching to an offer provider and receive, from the offer provider, an offer contextually-relevant to a subject matter of a media program being played on that channel. The offer system and method may then deliver the offer (or other content) to the media device for display as an overlay or as a pop-up ad during a break (e.g., a certain slot or position) in the media program. Alternatively, or additionally, the offer may be displayed on a screen device that is paired with a client media device, and thus the offer may be directly selectable by a user on a display of the screen device. As part of the offer selection process, interests of the user as determined from a user profile may be factored into selecting an offer for delivery to a particular user during a commercial.

To provide users with media content, an individual or an organization may stream the media content to users, such as by delivering the media content over a broadcast medium to the users. The media content used by the individual or the organization may be media content (such as video data) acquired from one or more live broadcast media feeds. For example, a media content provider may provide a user with a linear media channel (e.g., media provided from a live media feed source to a viewer) over a broadcast medium, such as via satellite, over the air, via telephone line, cable or the Internet.

The word "content" may be used to refer to media or multimedia. The word "content" may also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. Media or media content may include graphical representations, such as: videos, films, television shows, commercials, streaming video, and so forth; text; graphics; animations; still images; interactivity content forms; and so forth. An example of a type of content commonly referred to as a type of media is a "motion picture" referred to as "a film."

In one embodiment, a content overlay system or a content overlay device may enable combining media content with specific, timely, and/or targeted overlay content such as advertising, to include digital offers. The content overlay system or content overlay device may enable overlay content providers to engage with viewers by inviting the viewers to respond to a call to action within the content overlays (e.g., an invitation to engage the content overlay). One advantage of inviting the viewers to a call to action may be to provide a return path or follow-up path for the viewers to request additional information, ask questions, provide input, contact a provider of a service or product advertised, and so forth. Another advantage of inviting the viewer to a call to action may be to provide a return path or follow up path for the advertisers to provide additional information, further engage the viewers, gather additional information about the viewers, answer viewer questions about the product or service advertised, and so forth. In another example, the content overlay system or the content overlay device may enable an advertiser to use cross platform retargeting campaigns once a viewer has viewed and/or interacted with an overlay content of a media program.

FIG. 1 illustrates a system diagram of an offer distribution network 100 according to one embodiment. The offer distribution network 100 may include, for example, an audio-video (A/V) distribution network 101, content providers 102 (such as local broadcasters, multi-channel networks, and other content owners/distributors), media commercial providers 104, offer providers 106, advertising agencies 107 and an offer system 110, all of which may be executed on at least one computing device such as a server or computer, and have access to digital media content, commercials and offers. An offer, as referred to herein, extends to any offer, advertisement, coupon, deal, discount or in-kind benefit. In one embodiment, a commercial provider 104 can be integrated with an offer provider 106, e.g., be the same entity, as indicated by the dashed line. Additionally, or alternatively, an advertising agency 107 may also be an offer provider 106, e.g., be one and the same, as indicated by the dashed line.

The content providers 102 may broadcast media content over the A/V distribution network 101 or over a network 119 to any number of client media devices 115 (also referred to herein as internet-enabled media devices 115) that receive digital media such as television (TV) or other streamed A/V content (e.g., media content). Accordingly, the A/V distribution network 101 may be an intranet, an over-the-air (OTA) network, a cable network, a personal area network (PAN), a local area network (LAN), a wide area network (WAN) or a combination thereof. The network 119, furthermore, may be the Internet, an intranet or a combination of networks through which media content is streamed to client media devices through wired connections, wirelessly, or via a combination thereof.

The client media devices 115 may receive and interact with the media content from the content providers 102, the commercials (or advertisements) received from the commercial providers 104 and offers from the offer providers 106. The advertising agencies 107 may also provide advertisements and other offers that may also be available to deliver with the media content. The offer system 110 may collect commercial metadata from the commercials displayed (or slotted for display) during broadcasts or other streaming media provided by the content providers 102. The offer system 110 may store the commercial metadata in a commercial metadata database 114. The offer system 110 may further collect offer metadata from offers that are available from the offer providers 106 as overlays, pop-ups or other types of advertisements displayable over or in conjunction with a commercial or other advertisement. The offer system 110 may store the offer metadata in an offer metadata database 116. The offers that are retrieved, received or created as will be explained may be stored in an offers database 118.

The offer distribution network 100 may further include an automatic content recognition (ACR) system) 160, which will be discussed in more detail. The ACR system 160 may provide automatic content recognition capability to the offer system 110, in order to properly match up offers with commercials or with content being streamed to identified channels on the client media devices 115.

FIG. 2A illustrates a diagram of one embodiment of the offer system 110 of FIG. 1 within an offer distribution network 200. The offer distribution network 200 may include the offer system 110, a plurality of client media devices 115 and screen devices 215 that may be associated (or paired) with a client media device, as will be explained in more detail with reference to FIGS. 3A and 3B. In one embodiment, a client media device 115 is combined with a screen device 215 within a single communication device that operates as both devices in one. Each screen device 215 may also include a virtual wallet 240. In one embodiment, the offer distribution system 200 also include a synchronization manager 250 that manages synchronized control of the metadata and offers across the client media devices 115, the screen devices 215 and associated virtual wallets 240 as will be explained in more detail.

The offer system 110 may further include, but not be limited to, a commercial harvester 208, an offer harvester 212, a commercial offer mapper 220, an offer creator 222, an offer targeter 224, and a user tracker 226. The offer system 110 may further include the commercial metadata database 114, the offer metadata database 116 and the offers database 118.

The user tracker 226 may include, as subparts (or which may be executed separately), a pairing director 232, an offer tracker 236 and virtual wallets 240 associated with respective users of the screen devices 215 that are paired with corresponding client media devices 115 to which media content is being streamed. The virtual wallets 240 may further be located within the screen devices 215 and accessible by users of the client media devices 115 after collection, as will be explained in detail.

Figure 2B:
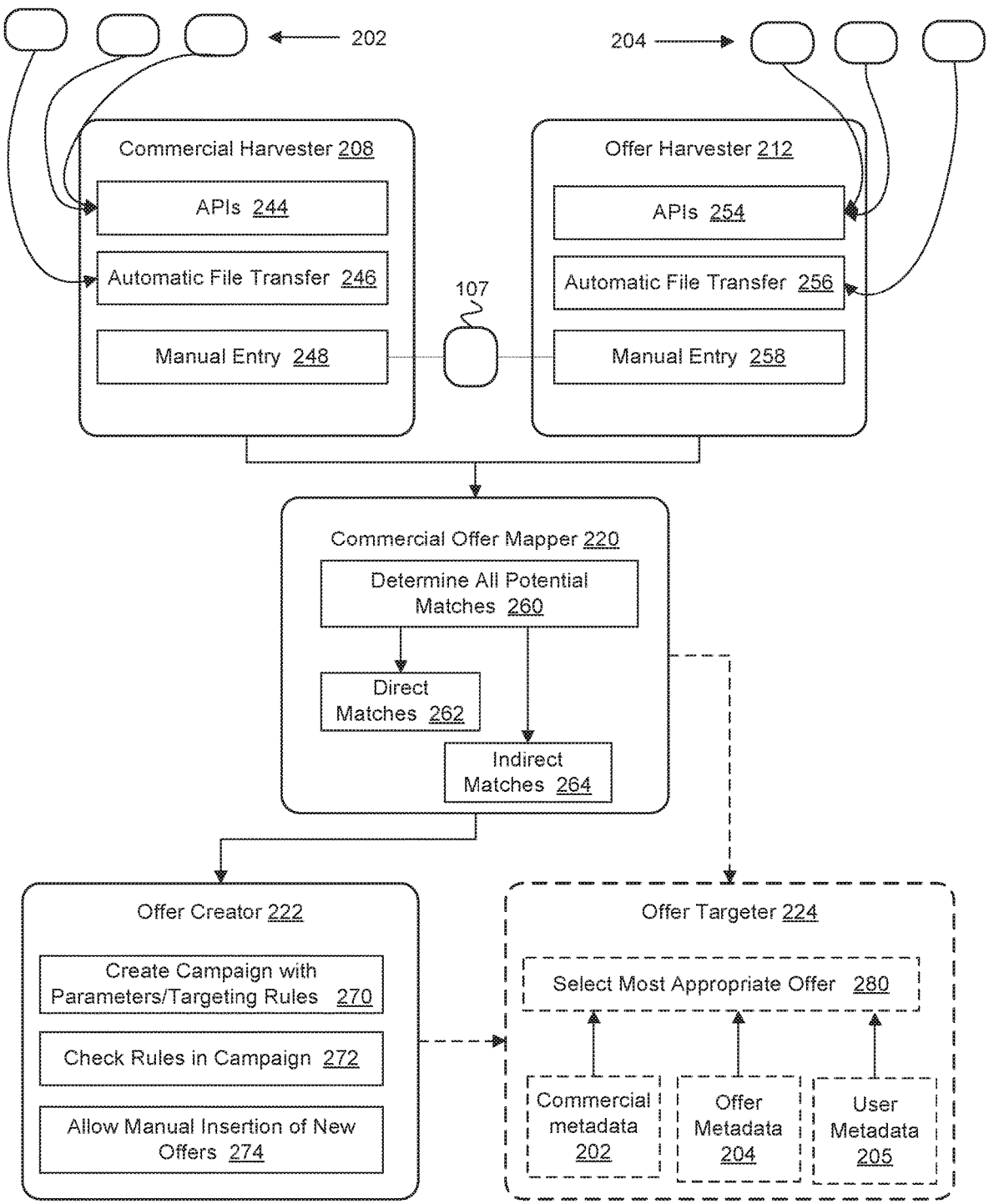
FIG. 2B illustrates a flow chart of one embodiment of a method for identifying an offer for digital overlay delivery during a streaming media commercial.

With additional reference to FIG. 2B, the commercial harvester 208 may analyze commercials that have been or are going to be streamed to the client media devices 115 from the content providers 102, and pull out commercial metadata 202 related to the commercials. Harvesting of the metadata 202 may further occur, additionally or alternatively, via application programming interfaces (APIs) 244, an automatic file transfer (246) (such as through a direct link connection), or a manual entry (248) (e.g., by an advertising agency). The commercial metadata 202 may include information such as shown for exemplary purposes in the commercial mockup of FIG. 4. For example, the commercial metadata 202 may include company or brand (e.g., in this example, BRAND_A), occurrence, co-op partner (such as BRAND_B in this case), a title, a category (e.g., wireless communications) or other topic or subject such as a subcategory (e.g., smartphone). The commercial metadata 202 may further include a celebrity in the commercial, a first run, a last run, a network or channel identifying the content provider 102, a geographic clearance or scope, and a description of the commercial. Although not shown in FIG. 4, the commercial metadata may also include information related to identified users being targeted such that comparisons may be made with relation to targeted users as well.

Figures 5A, 5B:
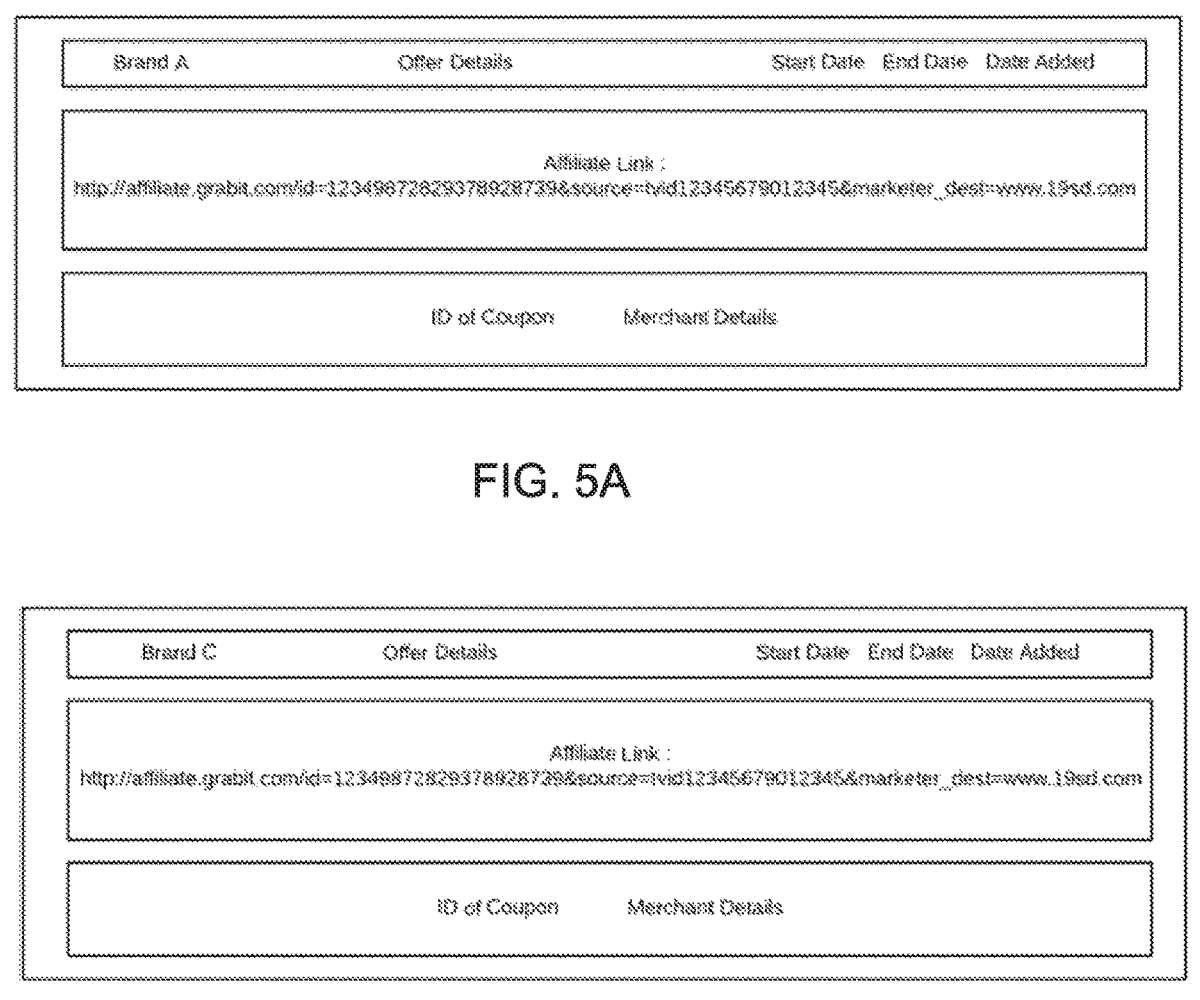

The offer harvester 212 may analyze offers and retrieve offer metadata 204 related to various offers that could be delivered in conjunction with specific commercials. This harvesting of the offer metadata 204 may occur via application programming interfaces (APIs) 254, an automatic file transfer (256) (such as through a direct link connection), or a manual entry (258) (e.g., by an advertising agency). As shown in FIGS. 5A and 5B, the offer metadata 204 may include company or brand. In FIG. 5A, the offer is for a BRAND_A product by BRAND_A, otherwise known as a direct offer because it comes from the brand owner. In FIG. 5B, the offer is for a BRAND_A product by BRAND_C, a vendor of the brand owner, thus otherwise known as an indirect offer. A contract or business relationship may exist between brand owner and vendor or retailer. The offer metadata 204 may further include what product is being discounted or offered for sale, and what that discount is. The offer metadata 204 may further include a uniform resource locator (URL) or other link to an online site from where a user may redeem the offer, whether there will be a fee for redemption, offer identification (ID) or other identifier, and start and end dates and times that the offer will remain in effect. Other offer metadata may be provided, and is not constrained by the examples of FIGS. 5A and 5B.

The commercial offer mapper 220 may then match specific offers with certain commercials by way of matching up certain parts of respective metadata, and target the specific offers to be delivered with those certain commercials (260). The commercial offer mapper 220 may determine all potential matches between media content commercials and offers, and store the matches in the offers database 118 (which may be linked to the commercial metadata database 114). An offer may need to meet a threshold level of matching a commercial before being identified as a potential match. For example, a certain amount of metadata may need to match where certain types of metadata may be weighted heavier over other types. Such offers may include both offers that would be considered direct matches 262 and those that would be considered indirect matches 264, as just explained.

The commercial offer mapper 220 may further perform a category match, for example, all of the commercials that are categorized as "Men's Fashion" may be matched against all of the offers that are categorized as Men's Fashion. In this example, the source of the product being from one manufacturer or brand provider as distinguished from another may not play a role. The offer targeter 224 may further perform product matches, for example, by matching the TV commercials categorized as "Product A" to the offers that relate to Product A (and the same could be done for Service A). While some products (or services) are provided by only a single entity, many products are made by numerous entities or sources, and thus the commercial offer mapper 220 may expand sources of available offers by enlarging the scope of its search. Additional or different searches may be performed for different kinds or a combination of patterns to which to match commercials (or advertisements) to offers for determining which offers to display with which commercials.

The offer creator 222 may create an advertising campaign with parameters and/or targeting rules (270). In some embodiments, particularly where there are few or no offers identified as matches by the commercial offer mapper 220, the offer creator 222 may create an offer that is best suited to a certain commercial and/or for targeting an identified user. This may be done by combining components of offers from offer providers 106 and/or by updating or changing an existing offer for better targeting or for compatibility with a content stream that includes the associated commercial. The offer creator 222 may check rules in the campaign (272) in creating an offer or pass those rules on to the offer targeter 224, which may help with targeting offers by the offer targeter 224, as will be explained. The offer creator 222 may also provide for manual insertion of new offers into certain campaigns (274) to comply with contract or in the absence of metadata for which matches could be provided.

As will be explained in more detail, the offer system 110 (or an associated content management system) may determine what program a user is watching, determine a channel (or uniform resource locator) on which that program is being streamed (e.g., with help from the ACR system 160), and then target specific offers to identified users watching a commercial for which an offer is targeted. In some cases, when the offer creator 222 creates the offer as just explained, the offer targeter 224 is not used because the offer creator 222 may perform the targeting function in generating an offer to be delivered to a specific user viewing a specific commercial. Accordingly, the offer targeter 224 is displayed in dashed lines as being optional in any given embodiment.

Figure 3A:
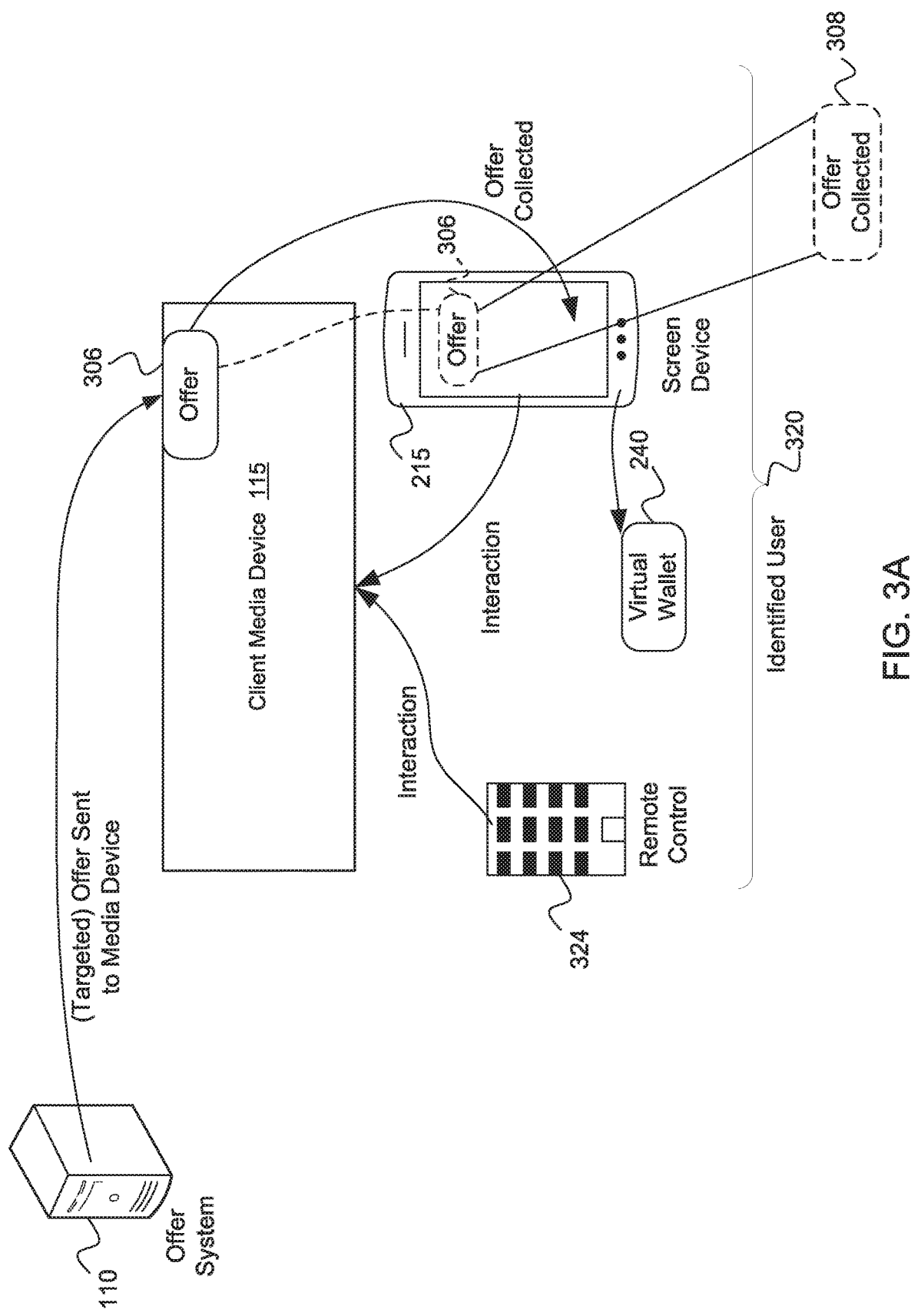
FIG. 3A illustrates a system diagram of an implementation of the offer distribution networks of FIGS. 1-2B.

When employed, the offer targeter 224 may select an offer best matching a commercial (280), and optionally targeted to a specific user, for delivery with that commercial. The offer targeter 224 may use the commercial metadata 202, the offer metadata 204 and a number of sources of user metadata 205 in determining targeting of an offer to a commercial being watched by an identified user. For example, the offer targeter 224 or the offer creator 222 may further consider the user metadata 205 in choosing an appropriate offer to serve with the commercial. In various embodiments, the user metadata 205 may include but not be limited to user-related metadata as well as user environment-related metadata. The user-related metadata may include but not be limited to user preferences, history of interaction by the user with other offers (e.g., previously choosing or passing up on an offer, deal or coupon), a profile of the user to include gender, family type, location, buying habits, and other interests. The user environment-related metadata may include weather, location of the user's client media device 115 (e.g., geo-targeting), daypart (or time) and other information coming from or based on the client media device 115 or on the screen device 215 (FIG. 3A). If an offer from a product or service provider of a certain brand or company is not available, the offer targeter 224 may select an offer available from a franchisee, retailer or vendors authorized to provide such branded products or services.

For example, the offer system 110 may distinguish between a direct offer and an indirect offer as follows. Direct offers may relate directly to the underlying commercial; for example, a TV commercial for BRAND_A may be matched to a coupon from BRAND_A. Indirect offers may be offers provided by the underlying TV commercial brand, but provide an indirect relationship to the company that owns the TV commercial brand. For example, the offer system 110 detects a TV commercial for BRAND_A, but and there are no offers stored in the offers database 118 for BRAND_A. Retailer A, however, stocks the products being advertised in the TV commercial for BRAND_A. An offer for Retailer A's products may therefore be presented to the user allowing BRAND_A's product to be used with Retailer A's offer.

As a more detailed example of a direct offer, suppose a Winn-Dixie™ television commercial is broadcast. The offer system 110 interrogates the databases 114, 116, and 118 for commercial metadata, offer metadata, and offers, respectively, and finds an appropriate Winn-Dixie™ offer (via the approach discussed with reference to FIG. 2B). The offer may then be compared to a known profile of the user. The user has indicated a preference for Coca-Cola® in the past. The offer system 110 finds an active coupon (e.g., an offer for a discount) for Coca-Cola® at Winn-Dixie™ in the offers database 118, which is considered the best coupon to deliver with the Winn-Dixie™ commercial.

Suppose, however, that there is no Coca-Cola® offer. A hierarchy of rules may be followed to serve a second-best offer, and so on. In this example, perhaps a percentage off a basket of items may be delivered instead. Because this is a direct offer (from Winn-Dixie™), only Winn-Dixie™ deals or coupons will be delivered with the Winn-Dixie™ commercial.

By way of further example of an indirect offer, a Coca-Cola® television commercial is now broadcast. The offer system 110 interrogates the databases 114, 116, and 118 to obtain commercial metadata, offer metadata, and offers, respectively, and finds an appropriate Coca-Cola® offer. Rather than not serve a direct offer, the offer system 110 may search for any indirect offers in the offers database 118. In one embodiment, the offer system 110 selects an indirect offer such as provided by a retailer or vendor that best targets the user (such as via the approach discussed with reference to FIG. 2B). For example, the offer system 110 may consider a number of available factors related to the user such as purchase history (e.g., store preference, product preference, and the like), geo-location information (what retailers are nearby, or any enhanced offers for retailers that are farther away), other user profile factors (e.g., gender, age), and the like. An indirect offer is not provided by an entity who is also the advertiser running the commercial (e.g., Coca-Cola® in this case), but indirectly, such as a retailer or vendor where the advertiser will still indirectly benefit (e.g., through a vendor sale). For example, a Winn-Dixie™ offer may be delivered in this embodiment where the user may redeem an offer for Coca-Cola at Winn-Dixie™.

When a recognized piece of content is played on the client media device 115, the commercial metadata (related to a product or service that is the subject of the commercial) may be matched to appropriate offer metadata, from which an offer may be selected that is then displayed on the client media device 115 as an overlay, pop-up or other kind of display ad. Once selected, the offer is considered collected by the user, and a confirmation of such selection may be provided by the offer or in conjunction with the offer in another part of the display of the client media device 115. Furthermore, a "Show More" selection option may be provided which, when selected by a user, may display a list of additionally available offers. The additional available offers may be obtained from those that ranked below the originally displayed offer when searched for by the offer targeter 224, but are nonetheless still relevant. In such a case, the user may want to select another offer to collect that offer.

The user tracker 226 may perform many functions, some of which will be explained in more detail. The user tracker 226 may track identified users, e.g., by an internet protocol (IP) address or a media access control (MAC) address, login or user identification (ID) from registration and through other means. In one embodiment, the user tracker 226 may also track user activity in relation to offers that are tagged with an advertising ID affiliated with a third party for goods or services (e.g., an Apple® advertising ID or a Google® advertising ID). Accordingly, the user tracker 226 may track the user's activity with respect to specifically identified goods or services being advertised by third party commercial or offer providers.

The user tracker 226 may thus track activity by a user such as, only by way of example: viewing behavior such as channels watched and when; interests to include types of programming watched or content accessed online with the client media devices 115; types of offers collected (using the offer tracker 236); and buying behavior generally as well as specifically associated with redeeming the offers (using the offer tracker 236). In one embodiment, the tracking of actual redemption of the offers is performed outside of the offer system 110, e.g., by an advertising agency, which information can be provided back to the offer system 110 for compilation with other tracked data for purposes of reporting. The user tracker 226 may also build user profiles with such information obtained from tracked user activity. These user profiles may be updated over time. In this way, user behavior related to specific offers may be tracked to determine the effectiveness of the combination of the commercial and the associated offer delivered as an overlay or otherwise in conjunction with the commercial. The offer targeter 224 may then access the user profiles in performing the targeting discussed previously.

The user tracker 226 may further track the number of times an offer was made available to a particular user, and after a predefined number of times not collecting the offer, the offer system 110 may rotate out the offer for a different offer. Effectiveness of this different offer may then be tracked and results of collection of this different offer recorded. As a further embodiment, the user tracker 226 may track which offers have already been collected, and function to deliver a different offer to a user when the user has already collected the originally selected offer. This alternative offer may be second on a ranked list, for example.

Offers may be collected by users in ways as will be described with reference to FIG. 3A. Such offers may be collected within and redeemed from virtual wallets 240, which may be stored and managed by the offer system 110. When offers are redeemed, a purchase normally is made by the user doing the redeeming, and thus a conversion may be logged, although a "conversion" may also include an impression (e.g., a click on the product offering) or a user browsing an affiliate website to which the offer links. This conversion activity may be tracked in conjunction with the offers in the offer metadata database 116, which may be linked or arranged in association with the offers in the offers database 118. Other types of metadata, such as location of user, affiliate partner that provides the offer, and the like, may be tracked in conjunction with redeeming and/or conversion activity, so that reporting may be performed in relation this type of data. In one embodiment, a cookie or software tag (or the like) may be associated with each offer, and thus after collection, the offer system 110 (or an affiliate's tracking system) may be able to track actions, including purchase or other type of conversion, taken with respect to individual offers.

The synchronization manager 250 may be integrated within the offer system 110 or may be its own standalone system, such as a service device that is communicatively coupled with the offer system 110, the client media devices 115 and with the associated screen devices 215. In one embodiment, the synchronization manager 250 may track and synchronize the offers stored in the offers database 118 as related to relevant metadata, and as related to the client media devices 115 and the screen devices 215 from which some of the metadata is derived and to which select ones of the offers may be targeted for delivery. The synchronization manager 250 may also track which screen devices 215 are paired to which client media devices 115.

The synchronization manager 250, therefore, helps to distinguish from which devices certain kinds of metadata are derived, to which devices select offers have been delivered, and which offers are currently stored in which virtual wallets 240. In this way, the synchronization manager helps the offer system 110 remain up to date in the offer creation and targeting performed by the offer system 110, and to alert the offer system 110 to select a different offer than a suggested offer when the suggested offer already resides in the virtual wallet 240 of a screen device 215 to which the suggested offer is to be delivered.

The synchronization manager 250 may also interface with the ACR system 160 to ensure the synchronization of the metadata and offers is properly timed to identified commercials on TV channels or via Internet websites (such as Uniform Resource Locator s (URLs)). For example, the synchronization manager 250 may receive a notification or signal from the ACR system 160 as to when identified commercials are streaming to which channels on a TV, media streaming application on a smart phone, tablet or the like, or are streaming to which websites on a computer, laptop, tablet or the like. The synchronization manager 250 can then go to the offer system 110 to obtain a relevant offer to deliver to a specific device at the proper time when a targeted commercial is about to be streamed. Accordingly, the synchronization manager 250 may act as a public facing entity that tracks and synchronizes the data, metadata and information used by the offer system 110 to function in a timely manner, so that offers are delivered to the correct client media devices 115 or screen devices 215 when the corresponding commercials being targeted are being streamed to the client media devices (or to a paired screen device itself).

FIG. 3A illustrates a system diagram of an implementation of the offer distribution networks 100 and 200 of FIGS. 1-2B. In one embodiment, the offer system 110 may select or create an offer 306 that optionally targets an identified user 320 of a client media device 115 (such as a TV or computer) and of a screen device 215 (such as a smart phone, a tablet, a laptop or other internet-enabled computing device). In one embodiment, the offer 306 may be delivered as an overlay, pop-up, in-lined or inset advertisement on a display of the client media device 115 at the time a related commercial is being displayed during an advertising slot of a media broadcast or the like. In another embodiment, the offer 306 is delivered as such an advertisement on a display of the screen device 215 to which the client media device 115 is paired and at the time a related commercial is being displayed on the client media device 115. The offer 306 may include text, images or animation and may appear across any section of the client media device 115, to any specified size, and with any color and content. The offer 306, when positioned as an overlay on top of a media commercial, may be dynamically or manually changed to not obscure the underlying content of the media commercial. For example, when the overlay is in the top left by default and the media commercial or advertisement includes a telephone number in the top left, the overlay may be moved to the top right or some other location.

By way of various examples, the offer 306 may be displayed on Internet-enabled TVs that have a Hypertext Markup Language (HTML5)-compliant browser. In this example, the offer 306 can be constructed as an HTML, cascading style sheet (CSS), or JavaScript object and rendered by the browser as an overlay on top of the underlying audio-video (A/V) content. Alternatively, or additionally, the offer 306 can be pre-generated as an image and injected into the graphics layer of the TV via system level Open Graphic Library (OpenGL) application programming interface (API) calls. Alternatively, or additionally, on Internet-enabled TVs that support industry standards such as Advanced Television System Committee 3.0 (ATSC 3.0), the offer 306 can be delivered via a defined graphical overlay component.

Further by way of example on screen devices 215, the offer 306 can be constructed and triggered as system notifications, such as Google Cloud Messaging (GCM) and Apple Push Notifications Services (APNs). Alternatively, or additionally, the offer 306 can be delivered as a JavaScript Object Notation (JSON), which is a lightweight data-interchange format, and rendered natively by any application as appropriate to a user interface of the screen device 215.

The client media device 115 may include an associated remote control 324. The pairing director 232 of the offer system 110 may interact with or otherwise enable a screen device 215 (e.g., any communication device that has a touch screen display) to also pair with the client media device 115. This pairing may be performed through or with the help of an application (or "app") installed on the screen device 215. The pairing may be performed by way of various private area networking (PAN) technology such as near field communication, a Bluetooth® connection developed by Bluetooth Special Interest Group (SIG), via infrared, wireless communication or wired communication and/or via a manual process specified as entering in a unique code on both devices that allow the screen device 215 and the client media device 115 to intercommunicate. In one embodiment, the pairing is not needed because the client media device 115 may be sold to the consumer with the screen device 215 that was already paired in the factory.

In one embodiment, the screen device 215 may also be able to track activity performed by the remote control 324, particularly with regards to interaction with the offer 306, by tracking such interaction on the client media device 115 with the screen device 215. In one example, the screen device 215 may detect selection of "Okay" or the like by the remote control 324 to collect an offer. The identified user 320 may select the offer 306 with either the remote control 324 or the screen device 215, once paired, and thus collect the offer 306.

More specifically, in one example, the selection of the offer is via a remote control action on the offer 306 as displayed on the client media device 115, whether by the remote control 324 or by the screen device 215. In another example, the selection is via a user selecting the offer 306 displayed as a notification or banner ad directly in the display of the screen device 215. This other example may use an application installed on the screen device 215 and in which the offers are displayed. When selected, a visual indication 308 of the selection of the offer may be shown on any or all connected devices, such as the client media device 115, the screen device 215 (and an additional screen device). When collected, the offer 306 may be added to a virtual wallet 240, which may be redeemed at a later time and location (e.g., either online or at a retail location) convenient to the user. The virtual wallet 240 may be available through the screen device 215 as well as through various other client media devices 115 of the identified user 320.

Figure 3B:
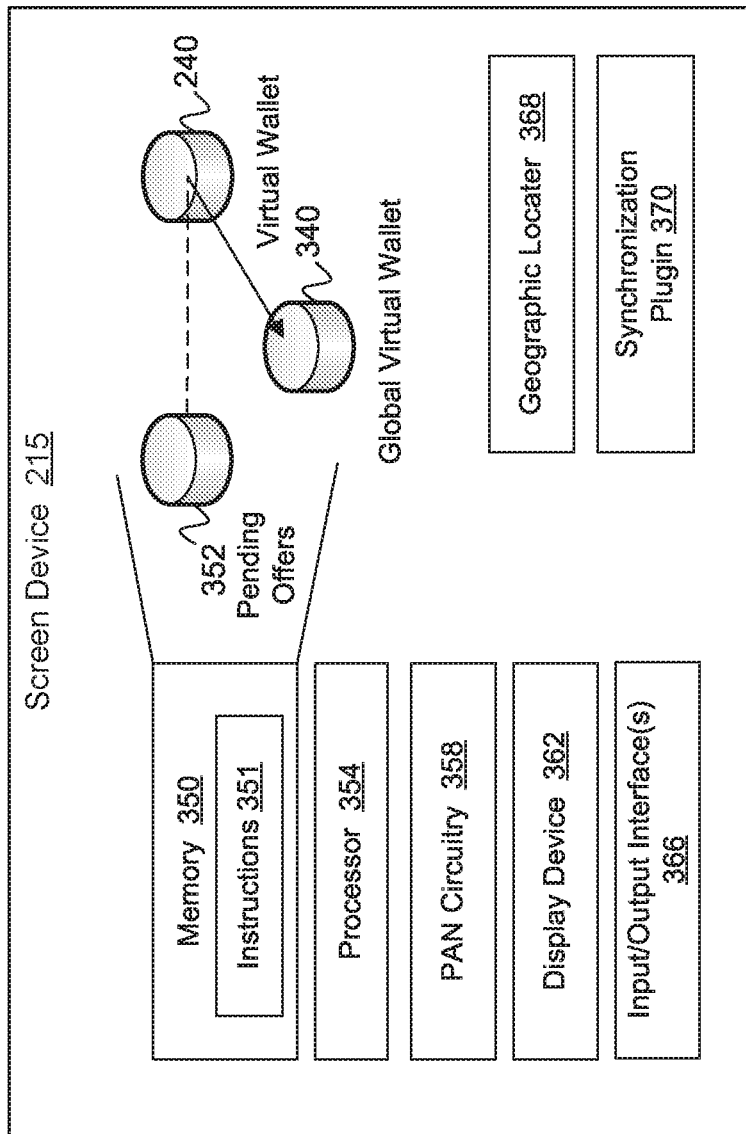
FIG. 3B illustrates a block diagram of a communication or screen device as illustrated in FIG. 3A, according to one embodiment of the present disclosure.

FIG. 3B illustrates a block diagram of a communications or screen device 215 as illustrated in FIG. 3A, according to one embodiment of the present disclosure. The screen device 215 may include memory 350 storing instructions (e.g., instructions for installing and executing an application), a processor 354, personal area network (PAN) circuitry 358 and a display device 362, which may include a touchscreen, input/output (I/O) interface(s) 366, and a geographic locater 368 (such as geo-positioning device or component).

The memory 350 may store a pending offers database 352, a virtual wallet 240 and a global virtual wallet 340. The virtual wallet 240 may feed collected offers to the global virtual wallet 340, which may then be redeemed on a wider scale. In one example, the global virtual wallet 340 is an Apple Pay Wallet from Apple® of Cupertino, Calif. In another example, the global virtual wallet 340 is a Google Wallet from Google® of Mountain View, Calif.

The display device 362 may include a touchscreen and various options within the application for interacting with the client media device 115, to collect offers, to browse and select additional offers and to redeem selected offers. The PAN circuitry 358 may facilitate pairing the screen device 215 with the client media device 115 as discussed.

The pending offers database 352 may be a repository for storing a plurality of offers that have been offered in conjunction with commercials streamed to the client media device 115. For example, the offers may be queued in the pending offers database 352 chronologically or organized according to brand owner (or the like) and delivered to the application being run on the screen device 215. In this way, a user that missed some of the offers because the user was not present when corresponding commercials were streamed to the client media device 115, may browse and select additional offers from within the application. These selected additional offers may then be moved to the virtual wallet 240 from which the offers may be redeemed, e.g., at or through a POS device of a vendor or retailer, or online.

The screen device 215 may further include a synchronization plugin 370 or other logic that works in conjunction with the synchronization manager 150, such as to tag metadata from the screen device 215 with an identifier or other code unique to the screen device 215. The synchronization plugin 370 may further ensure proper timing of offer delivery when a relevant commercial is played, e.g., though receipt of ACR signals from the synchronization manager 150 that provides this information. The synchronization plugin 370 may further ensure the synchronization manager 150 is updated with the latest offers collected with the virtual wallet 240.

Figure 6A:
FIGS. 6A and 6B illustrate several screen shots of a virtual wallet displaying a digital offer after the offer has been collected.
Figure 6B:
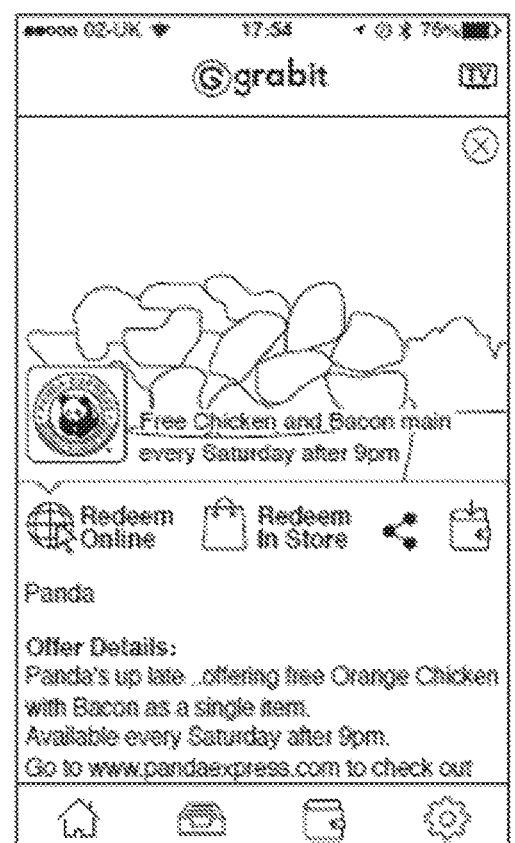

FIGS. 6A and 6B illustrate screen shots of a virtual wallet displaying a digital offer after the offer has been collected. Different options are provided for redemption, such as redeeming in store, e.g., through a point-of-sale (POS) system, or online or through other means and in other contexts.

Figure 7A:
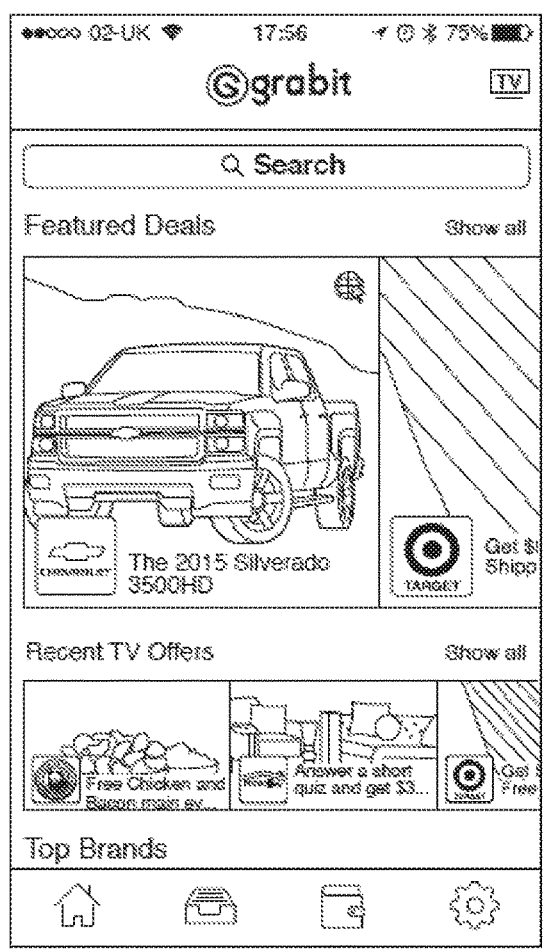
FIGS. 7A, 7B, and 7C illustrate several screen shots of a virtual wallet in which a digital offer is detected, collected and displayed with other collected offers.
Figure 7B:
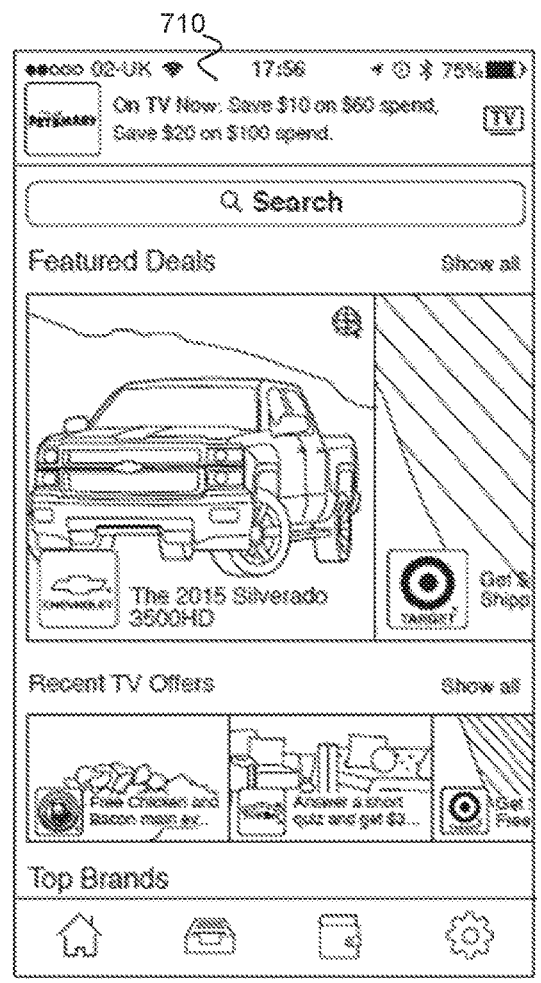
Figure 7C:

FIGS. 7A, 7B, and 7C illustrate several screen shots of a virtual wallet in which a digital offer is detected, collected and displayed with other collected offers. In FIG. 7A, content about "The 2015 Silverado 3500HD" is displayed as a featured deal, and recent TV offers are listed towards the bottom of the screen of a mobile device application (although these Figures may be displayed in a computer browser or the like as well). The screen in FIG. 7B displays a banner 710 in which an offer for PetSmart is displayed (Save $10 on $50 spend, or Save $20 on $100 spend). This offer may be detected so that the user may select the offer, and thus place the offer 306 into the virtual wallet 340, which is displayed in FIG. 7C. The virtual wallet may then display (such as in a tabbed fashion with a brief description on each tab), which offers are available for redemption. If a long list of offers is saved in the virtual wallet, the virtual wallet may be scrollable or text searchable to help a user find a relevant or desired offer quickly.

With further reference to FIGS. 3A and 3B, if the user is not present and is unable to collect the offer at the time of the TV commercial, the user may be able to browse, using the screen device 215, to track and display recently missed (or pending) offers based on the commercial broadcast activity of the connected client media device 115. In one embodiment, when the screen device 215 is paired to the client media device 115, the screen device tracks the commercials that were played but missed by the user. So, for example, when the user leaves the room for a period of time and is therefore missing the content of a television being played, the application on the screen device 215 may show the user what commercials played and their linked offers, which the user may then collect from the screen device 215. As long as the television is on, the offers may continue to accumulate and be available to the user, e.g., through the screen device 215.

More specifically, because the offer system 110 stores historical commercial metadata, the offer system 110 may also deliver offers for display on the screen device that were missed by the user during certain periods of time. For example, if a user wanted to see what offers were displayed during a live televised event (where potentially the best offers were available), the user may browse through these commercials and collect the associated offers, ensuring that a user does not miss the best deals.

The offer tracker 236, in conjunction with the user tracker 226, may be able to track which offer was displayed with which media commercial or advertisement, whether the offer was selected, whether the user engaged that offer to view more detail about a product or service online (e.g., a product or service related to the commercial or the offer), and what transactions came about by virtue of the user redeeming the offer.

As discussed, offers may be stored in a virtual (or cloud-based) wallet 340 that is accessible to a user from a number of different devices. A virtual wallet may contain the collected offers. Offers within the virtual wallet 340 may be integrated with a point-of-sale (POS) device via communication technologies such as Bluetooth®, near field communication (NFC) and the like that allow the transfer of the information held within the offer from point to point, e.g., directly between the screen device 215 (or other device) and a retailer or vendor's POS system. In addition, the virtual wallet 340 may allow offers to be integrated into third party wallets or other third party coupon wallet aggregators. Even in this case, the activity related to such offers may be tracked by a cookie or other embedded code that may communicate back to the offer tracker 236 to determine how and when the offer was redeemed, including whether the offer was redeemed online or at a physical store location, and at which websites or stores the offer was redeemed. The offer tracker 236 may then message the user on the screen device 215, prompting the user to supply additional information about the transaction, satisfaction with a product or service and the like. This additional information may also be stored in the offer metadata database 116 and be used for future targeting of additional users or the same user that redeemed an offer.

The data that is tracked and stored in the offers database 118, the offer metadata database 116 and the commercial metadata database 114 may be indexed such that the data may be made available through a graphical user interface (GUI) to administrators, commercial and offer providers, and other customers of the offer system 110.

The offer system 110 allows for the right product offer to be matched to underlying broadcast content, optionally targeted to a specific user, and saved by a user to their cloud-based or virtual wallet. The offer system 110 may choose the right offer based on the user collecting the product offer from a broadcast commercial. The present disclosure obviates the need of the user to manually search for a product offer or clip a physical product offer, in making the selection and redemption of the product offer seamless in conjunction with viewing and interacting with video-based advertising.

USE CASES

1—A television commercial is broadcast for Retailer A. The offer system detects that Retailer A's commercial is currently playing and then decides the best product offer or coupon to display as an overlay on a client media device or as a notification on a paired a screen device. User A sees the offer and collects the offer using a remote control or the screen device. The product offer may then be saved to a virtual wallet for use online at Retailer A's website or at one of Retailer A's physical retail premises.

2—A television commercial is broadcast for Retailer B. The offer system detects that Retailer B's commercial is currently playing. The system has no matching, direct offers for 'Retailer B,' so looks at related product offers and coupons stored on the processing device. The processing device finds a number of indirect matches that are then displayed as an overlay on a client media device or as a screen device notification. User A sees the product offer and then collects the product offer using a remote control or the screen device. The product offer may then be saved to a virtual wallet for use online at an appropriate web site or at an appropriate physical retail premises.

FIG. 8 illustrates a flowchart 800 of a method of providing digital offers on a connected media device. The method may be at least partially performed by processing logic that may include hardware (e.g., circuitry, dedicated logic, programmable logic, microcode, etc.), software (e.g., instructions executed by a processing device), firmware or a combination thereof. The method may be performed by processing logic of the offer system 110 (FIG. 1), client device such as a client media device 115, by a server system such as the ACR system 160 of or the like. Alternatively, the method may be performed by other processing devices in various types of user device, portable devices, televisions, projectors, or other media devices.

Referring to FIG. 8, the processing logic begins with harvesting (and storing) commercial metadata related to broadcast commercials such as TV or broadcast commercials (810). The logic may continue by harvesting (and storing) offer metadata related to offers available to deliver, as an overlay or pop-up ad or the like, with the broadcast commercials (820). The logic may continue by matching the commercial metadata to the offer metadata to determine which offers best to display on (or in conjunction with)

which broadcast commercials (822), for example, which offers are most relevant to subject matter of each broadcast commercial.

With continued reference to FIG. 8, the logic may continue by determining a commercial is to be displayed on a channel or stream being watched by a user on a client media device (824). The logic may further continue by filtering the offers to choose an offer targeted at the user or that matches subject matter of the commercial, such as a product or service sold by a brand owner to which the commercial relates (830). The logic may continue by delivering the offer as an overlay or pop-up ad to the commercial while the user is streaming the channel (or stream) to the client media device (840). Optionally, this step may also include delivering the offer as a notification to a paired communication device, such as the screen device 215. The logic may continue by receiving an indication of selection of the offer by a remote control or other paired communication device (850). The logic may further continue by transferring the offer to a virtual wallet accessible with the paired communication device, and optionally also from other devices (860). Any combination of these steps may be performed by the method of FIG. 8; accordingly, some steps like the step of blocks 824 and 830 may be skipped.

Figure 9:
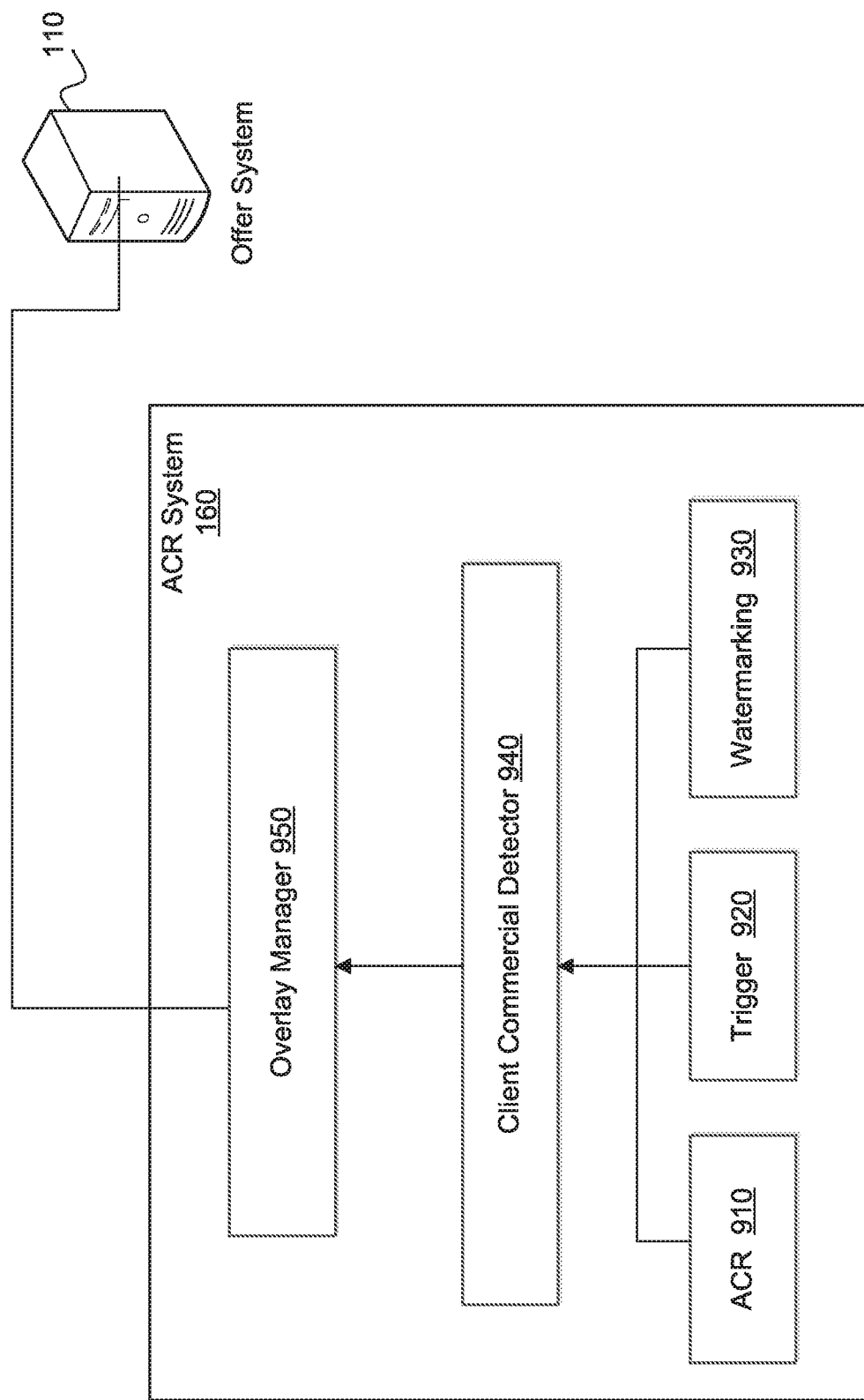
FIG. 9 illustrates an exemplary automatic content recognition (ACR) system according to one embodiment.

FIG. 9 illustrates an exemplary automatic content recognition (ACR) system 160 according to one embodiment. The ACR system 900 may include, but not be limited to, sources of media that may carry different kinds of identifying features, including ACR 910, other triggers 920 and watermarking 930. A client commercial detector 940 may detect commercials (e.g., media advertisements) with the streaming media according to these and possibly other identifying features. Upon detection, the client commercial detector 940 may send an identification of the commercial, which may include a channel or stream carrying the commercial, to an overlay manager 950. The overlay manager 950 may send an identification of the commercial, compatible types of offers and any other information that may be needed by the offer system 110 to be able to choose and target an offer to any of client media devices 115 that are streaming the commercial.

Figure 10:
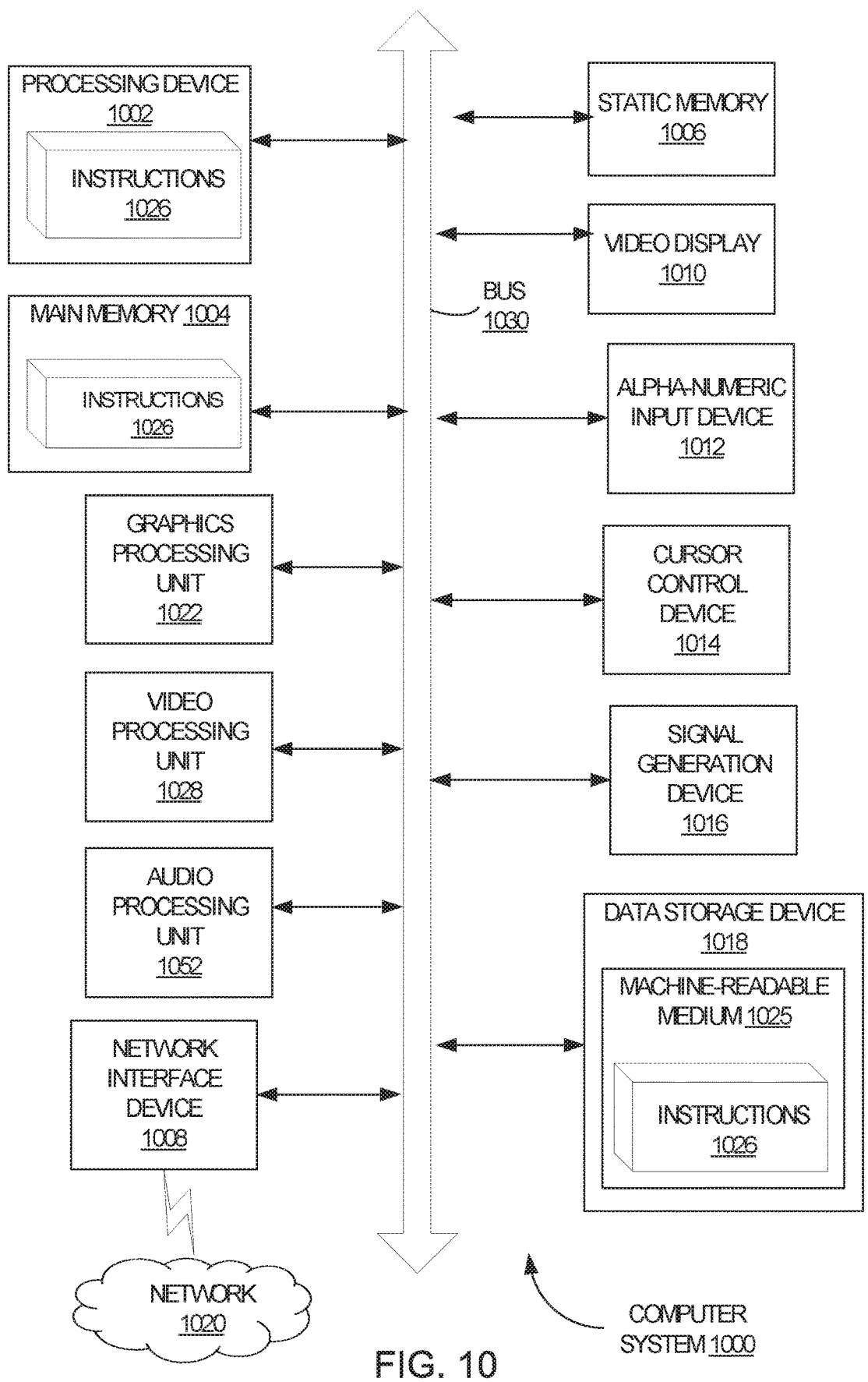
FIG. 10 illustrates a diagrammatic representation of a machine in the example form of a computer system within which a set of instructions, for causing the machine to perform any one or more of the methodologies discussed herein, may be executed.

FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1000 may correspond to the offer system 110, to the ACR system 160, or to any content manager present in addition to or in lieu of the offer system 110. The computer system 1000 may also correspond to any client media device 115 (e.g., Internet-enabled media devices) as those devices are broadly disclosed herein. The computer system 1000 may correspond to at least a portion of a cloud-based computer system.

The computer system 1000 includes a processing device 1002, a main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In one embodiment, processing device 1002 may include one or more processing cores. The processing device 1002 may execute the instructions 1026 of a mirroring logic for performing the operations discussed herein.

The computer system 1000 may further include a network interface device 1008 communicably coupled to a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a signal generation device 1016 (e.g., a speaker), or other peripheral devices. Furthermore, computer system 1000 may include a graphics processing unit 1022, a video processing unit 1028, and an audio processing unit 1032. In another embodiment, the computer system 1000 may include a chipset (not illustrated), which refers to a group of integrated circuits, or chips, that are designed to work with the processing device 1002 and controls communications between the processing device 1002 and external devices. For example, the chipset may be a set of chips on a motherboard that links the processing device 1002 to very high-speed devices, such as main memory 1004 and graphic controllers, as well as linking the processing device 1002 to lower-speed peripheral buses of peripherals, such as USB, PCI or ISA buses.

The data storage device 1018 may include a computer-readable storage medium 1025 on which is stored instructions 1026 embodying any one or more of the methodologies of functions described herein. The instructions 1026 may also reside, completely or at least partially, within the main memory 1004 and/or within the processing device 1002 during execution thereof by the computer system 1000; the main memory 1004 and the processing device 1002 also constituting computer-readable storage media.

The computer-readable storage medium 1025 may also be used to store instructions 1026 utilizing logic and/or a software library containing methods that call the above applications. While the computer-readable storage medium 1025 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions 1026 for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention may be applied to other types of circuits or semiconductor devices that may benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention may be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions may be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the invention may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
receiving, at a computing system:
    media content from a broadcast stream to be streamed to a client media device, and
    available offers from at least one offer provider of an offer distribution network;
identifying, by the computing system, using automatic content recognition, media content metadata related to the media content;
using, by the computing system, the identified media content metadata to select, from the available offers, a targeted offer, wherein using the identified media content metadata to select the targeted offer comprises:
    determining, based on the identified media content metadata, whether the available offers comprise one or more direct offers, and
    based on whether the available offers comprise the one or more direct offers, selecting the targeted offer, wherein selecting the targeted offer comprises:
        responsive to determining that the available offers comprise the one or more direct offers, using the identified media content metadata and at least a first type of data to select the targeted offer from the one or more direct offers, wherein the first type of data comprises one or more of brand and entity information, or
        responsive to determining that the available offers do not comprise the one or more direct offers, using a second type of data to select the targeted offer from the available offers, wherein the second type of data is different from the first type of data; and
    responsive to using the identified media content metadata to select the targeted offer, automatically delivering, by the computing system, the selected targeted offer to the client media device such that, while the media content is being streamed to and displayed by the client media device, the client media device also displays the selected targeted offer.

2. The method of claim 1, wherein determining whether the available offers comprise the one or more direct offers comprises determining that the available offers comprise the one or more direct offers,
- wherein using the identified media content metadata and at least the first type of data to select the targeted offer from the one or more direct offers comprises using the identified media content metadata, offer metadata for the one or more direct offers, and the second type of data to select the targeted offer from the one or more direct offers, and
- wherein the second type of data comprises user metadata indicating a preference for offer content.

3. The method of claim 1, wherein determining whether the available offers comprise the one or more direct offers comprises determining that the available offers do not comprise the one or more direct offers, and
- wherein using the second type of data to select, from the available offers, the targeted offer comprises:
  - determining that the targeted offer has offer metadata indicating a commercial relationship with a brand or an entity associated with the media content;
  - in response to determining that the targeted offer has offer metadata indicating the commercial relationship with the brand or the entity associated with the media content, determining that the targeted offer is an indirect offer; and
  - using the second type of data to select the targeted offer from the available offers based on determining that the targeted offer is the indirect offer.

4. The method of claim 1, wherein the media content includes one or more of a media program or a broadcast commercial.

5. The method of claim 1, further comprising:
- delivering, by the computing system, the selected targeted offer over a personal area network to a display of a screen device while the media content is being streamed to the client media device; and
- determining, by the computing system, that the displayed selected targeted offer has been selected at the screen device for redemption of the displayed selected targeted offer; and
- in response to determining that the displayed selected targeted offer has been selected at the screen device for redemption of the displayed selected targeted offer, transferring, by the computing system, the displayed selected targeted offer to a virtual wallet accessible by the screen device.

6. The method of claim 1, wherein the selected targeted offer is automatically delivered with an identifier configured to track redemption of the selected targeted offer.

7. The method of claim 1, wherein determining whether the available offers comprise the one or more direct offers comprises determining that the available offers do not comprise the one or more direct offers,
- wherein the second type of data comprises user metadata, and
- wherein using the second type of data to select the targeted offer from the available offers comprises using, from the user metadata, one or more of (i) purchase history, (ii) geo-location information, and (iii) user profile factors, to select the targeted offer.

8. A non-transitory computer readable medium having stored thereon instructions that, upon execution by a processor, cause performance of a set of acts comprising:
- receiving, at a computing system:
  - media content from a broadcast stream to be streamed to a client media device, and
  - available offers from at least one offer provider of an offer distribution network;
- identifying, by the computing system, using automatic content recognition, media content metadata related to the media content;
- using, by the computing system, the identified media content metadata to select, from the available offers, a targeted offer, wherein using the identified media content metadata to select the targeted offer comprises:
  - determining, based on the identified media content metadata, whether the available offers comprise one or more direct offers, and
  - based on whether the available offers comprise the one or more direct offers, selecting the targeted offer, wherein selecting the targeted offer comprises:
    - responsive to determining that the available offers comprise the one or more direct offers, using the identified media content metadata and at least a first type of data to select the targeted offer from the one or more direct offers, wherein the first type of data comprises one or more of brand and entity information, and
    - responsive to determining that the available offers do not comprise the one or more direct offers, using a second type of data to select the targeted offer from the available offers, wherein the second type of data is different from the first type of data; and
- responsive to using the identified media content metadata to select the targeted offer, automatically delivering, by the computing system, the selected targeted offer to the client media device such that, while the media content is being streamed to and displayed by the client media device, the client media device also displays the selected targeted offer.

9. The non-transitory computer readable medium of claim 8, wherein using the identified media content metadata and at least the first type of data to select the targeted offer from the one or more direct offers comprises using the identified media content metadata, offer metadata for the one or more direct offers, and the second type of data to select the targeted offer from the one or more direct offers, and
- wherein the second type of data comprises user metadata indicating a preference for offer content.

10. The non-transitory computer readable medium of claim 8, wherein using the second type of data to select, from the available offers, the targeted offer comprises:
- determining that the targeted offer has offer metadata indicating a commercial relationship with a brand or an entity associated with the media content;
- in response to determining that the targeted offer has offer metadata indicating the commercial relationship with the brand or the entity associated with the media content, determining that the targeted offer is an indirect offer; and
- using the second type of data to select the targeted offer from the available offers based on determining that the targeted offer is the indirect offer.

11. The non-transitory computer readable medium of claim 8, wherein the media content includes one or more of a media program or a broadcast commercial.

12. The non-transitory computer readable medium of claim 8, the set of acts further comprising:
- delivering, by the computing system, the selected targeted offer over a personal area network to a display of a screen device while the media content is being streamed to the client media device; and determining, by the computing system, that the displayed selected targeted offer has been selected at the screen device for redemption of the displayed selected targeted offer; and in response to determining that the displayed selected targeted offer has been selected at the screen device for redemption of the displayed selected targeted offer, transferring, by the computing system, the displayed selected targeted offer to a virtual wallet accessible by the screen device.

13. The non-transitory computer readable medium of claim 8, wherein the selected targeted offer is automatically delivered with an identifier configured to track redemption of the selected targeted offer.

14. The non-transitory computer readable medium of claim 8, wherein the second type of data comprises user metadata indicating a preference for offer content, and wherein using the second type of data to select the targeted offer from the available offers comprises:
determining, by the computing system, that the targeted offer comprises offer metadata that matches the user metadata indicating the preference for offer content; and in response to determining that the targeted offer comprises offer metadata that matches the user metadata indicating the preference for offer content, selecting the targeted offer, wherein the user metadata comprises at least one of a user purchase history, user geo-location information, or user demographics.

15. A computing system comprising:
a processor; and
a non-transitory computer readable medium having stored thereon instructions that, upon execution by the processor, cause performance of a set of acts comprising:
receiving:
media content from a broadcast stream to be streamed to a client media device, and
available offers from at least one offer provider of an offer distribution network;
identifying, using automatic content recognition, media content metadata related to the media content;
using the identified media content metadata to select, from the available offers, a targeted offer, wherein using the identified media content metadata to select the targeted offer comprises:
determining, based on the identified media content metadata, whether the available offers comprise one or more direct offers, and
based on whether the available offers comprise the one or more direct offers, selecting the targeted offer, wherein selecting the targeted offer comprises:
responsive to determining that the available offers comprise the one or more direct offers, using the identified media content metadata and at least a first type of data to select the targeted offer from the one or more direct offers, wherein the first type of data comprises one or more of brand and entity information, and
responsive to determining that the available offers do not comprise the one or more direct offers, using a second type of data to select the targeted offer from the available offers, wherein the second type of data is different from the first type of data; and
responsive to using the identified media content metadata to select the targeted offer, automatically delivering the selected targeted offer to the client media device such that, while the media content is being streamed to and displayed by the client media device, the client media device also displays the selected targeted offer.

16. The computing system of claim 15, wherein using the identified media content metadata and at least the first type of data to select the targeted offer from the one or more direct offers comprises using the identified media content metadata, offer metadata for the one or more direct offers, and the second type of data to select the targeted offer from the one or more direct offers, and wherein the second type of data comprises user metadata indicating a preference for offer content.

17. The computing system of claim 15, wherein using the second type of data to select, from the available offers, the targeted offer comprises:
determining that the targeted offer has offer metadata indicating a commercial relationship with a brand or an entity associated with the media content;
in response to determining that the targeted offer has offer metadata indicating the commercial relationship with the brand or the entity associated with the media content, determining that the targeted offer is an indirect offer; and
using the second type of data to select the targeted offer from the available offers based on determining that the targeted offer is the indirect offer.

18. The computing system of claim 15, wherein the media content includes one or more of a media program or a broadcast commercial.

19. The computing system of claim 15, the set of acts further comprising:
delivering the selected targeted offer over a personal area network to a display of a screen device while the media content is being streamed to the client media device; and
determining that the displayed selected targeted offer has been selected at the screen device for redemption of the offer; and
in response to determining that the displayed selected targeted offer has been selected at the screen device for redemption of the displayed selected targeted offer, transferring the displayed selected targeted offer to a virtual wallet accessible by the screen device.

20. The computing system of claim 15, wherein the second type of data comprises user metadata indicating a preference for offer content, and wherein using the second type of data to select the targeted offer from the available offers comprises:
determining that the targeted offer comprises offer metadata that matches the user metadata indicating the preference for offer content; and
in response to determining that the targeted offer comprises offer metadata that matches the user metadata indicating the preference for offer content, selecting the targeted offer,
wherein the user metadata comprises at least one of a user purchase history, user geo-location information, or user demographics.

* * * * *